US010673955B2

(12) United States Patent
Fransazov et al.

(10) Patent No.: US 10,673,955 B2
(45) Date of Patent: Jun. 2, 2020

(54) SYSTEMS AND METHODS FOR NEGOTIATION OF STRUCTURED CONFIGURATION PARAMETERS FOR STATEFUL SERVER/CLIENT SYSTEMS

(71) Applicant: Microsoft Technology Licensing, LLC, Redmond, WA (US)

(72) Inventors: Mariyan Dimitrov Fransazov, Kirkland, WA (US); David Nissimoff, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 300 days.

(21) Appl. No.: 15/478,434

(22) Filed: Apr. 4, 2017

(65) Prior Publication Data
US 2018/0288165 A1    Oct. 4, 2018

(51) Int. Cl.
*H04L 15/16* (2006.01)
*H04L 29/08* (2006.01)
*H04L 29/06* (2006.01)

(52) U.S. Cl.
CPC ............ *H04L 67/141* (2013.01); *H04L 67/02* (2013.01); *H04L 67/10* (2013.01); *H04L 67/125* (2013.01); *H04L 67/42* (2013.01); *H04L 69/24* (2013.01)

(58) Field of Classification Search
CPC ..... H04L 69/24; H04L 41/5009; H04L 47/70; H04L 67/1012; H04L 67/142; H04L 67/34; G06F 9/50; G06F 9/5016
USPC ........................................................ 709/227
See application file for complete search history.

(56) References Cited

U.S. PATENT DOCUMENTS

| 6,701,363 | B1 | 3/2004 | Chiu et al. |
| 7,324,226 | B2 | 1/2008 | Fritz et al. |
| 7,975,000 | B2 | 7/2011 | Dixon et al. |
| 8,924,573 | B2 | 12/2014 | Kruse et al. |
| 8,959,239 | B2 * | 2/2015 | Pettersson ............... H04L 65/80 709/227 |
| 9,253,532 | B2 | 2/2016 | Chen et al. |
| 2010/0223456 | A1 | 9/2010 | Schneider |
| 2011/0314079 | A1 | 12/2011 | Karande et al. |

(Continued)

OTHER PUBLICATIONS

Verma, et al., "NTM—Progressive Trust Negotiation in Ad Hoc Networks", In Proceedings of Joint IEI/IEE Symposium on Telecommunication Systems Research, Nov. 2001, pp. 1-6.

(Continued)

*Primary Examiner* — Wing F Chan
*Assistant Examiner* — Andrew Woo
(74) *Attorney, Agent, or Firm* — Ray Quinney & Nebeker P.C.; James Bullough

(57) ABSTRACT

Systems and methods are provided and include a processor, memory, and an application that is stored in the memory and includes instructions. The instructions are configured to initiate a stateful session for the application and receive an initial server response including at least one configuration parameter to be used during the stateful session. The instructions are further configured to determine whether the at least one configuration parameter is not acceptable and send an initial client response to the server in response to a determination that the at least one configuration parameter is not acceptable, the initial client response including a proposed adjustment to the at least one configuration parameter.

23 Claims, 9 Drawing Sheets

(56) References Cited

U.S. PATENT DOCUMENTS

| | | |
|---|---|---|
| 2012/0303719 A1 | 11/2012 | Netto |
| 2012/0311025 A1 | 12/2012 | Garcia aranda |
| 2013/0080619 A1* | 3/2013 | Assuncao .......... G06F 9/45558 |
| | | 709/224 |
| 2014/0376606 A1 | 12/2014 | Meier et al. |
| 2016/0198021 A1 | 7/2016 | Mooney |
| 2016/0203028 A1 | 7/2016 | Wong et al. |
| 2016/0323374 A1 | 11/2016 | Russinovich et al. |

OTHER PUBLICATIONS

Scholz, et al., "Content negotiation", https://developer.mozilla.org/en-US/docs/Web/HTTP/Content_negotiation, Published on: Feb. 2, 2017, 8 pages.

* cited by examiner

SYSTEMS AND METHODS FOR NEGOTIATION OF STRUCTURED CONFIGURATION PARAMETERS FOR STATEFUL SERVER/CLIENT SYSTEMS

FIELD

The present disclosure relates to stateful cloud server client systems, and more particularly to systems and methods for bidirectional negotiation of structured configuration parameters for stateful server/client systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Stateful cloud services require a server computer that tracks and stores a current state of an application running on a client computer during a cloud services session and that allocates resources, including computational resources, memory resources, and storage resources for the particular cloud services session associated with the client computer. For example, web applications, including web authoring tools, can run within a web browser of a client computer that is in communication with a server computer. During the cloud services session, the server computer can provide code and content to client computers to run the web application in the web browser of the client computers. For further example, an application design tool, such as PowerApps®, can be run within a web browser and used to create a mobile application, for example, for a mobile device. During an application design session, a user can drag user interface elements, such as sliders, buttons, and text, onto a blank canvas within the web browser to design and build a mobile application. While the web application is running on the client computers, such as in the web browser of the client computer, the client computers are in communication with the server computer to receive code and content for the web application based on user input received by the client computer. When initiating a cloud services session for each of the client computers, the server computer may establish various configuration parameters to govern, for example, the amount of server resources dedicated to each of the client computers along with configuration various options for the cloud services session. Traditionally, these configuration options are set to default values determined on the server computer side.

SUMMARY

A system is provided and includes a processor, memory, and an application stored in the memory and including instructions, which are executable by the processor. The instructions are configured to initiate a stateful session for the application by sending a session initiation request to a server. The instructions are further configured to receive an initial server response from the server in response to the session initiation request, the initial server response including instructions for the application and at least one configuration parameter to be used during the stateful session. The instructions are further configured to determine, based on the instructions for the application received from the server, whether the at least one configuration parameter is not acceptable. The instructions are further configured to send an initial client response to the server in response to a determination that the at least one configuration parameter is not acceptable, the initial client response including a proposed adjustment to the at least one configuration parameter.

In other features, a server is provided that includes a processor, memory, and a server application stored in the memory and including instructions, which are executable by the processor. The instructions are configured to receive a session initiation request from a client to initiate a stateful session for a client application. The instructions are further configured to send an initial server response to the client in response to the session initiation request, the initial server response including instructions for the client application and at least one configuration parameter to be used during the stateful session. The instructions are further configured to determine whether the client has approved the at least one configuration parameter. The instructions are further configured to send a subsequent server response in response to a determination that the client did not approve the at least one configuration parameter, the subsequent server response including a revision to the at least one configuration parameter. The instructions are further configured to store session state information in the memory, the session state information corresponding to a state of the client application running on the client during the stateful session.

In other features, a method is provided and includes initiating, with a client, a stateful session for an application by sending a session initiation request to a server. The method further includes receiving, with the client, an initial server response from the server in response to the session initiation request, the initial server response including instructions for the application and at least one configuration parameter to be used during the stateful session. The method further includes determining, with the client, based on the instructions for the application received from the server, whether the at least one configuration parameter is not acceptable. The method further includes sending, with the client, an initial client response to the server in response to a determination that the at least one configuration parameter is not acceptable, the initial client response including a proposed adjustment to the at least one configuration parameter.

In other features, a method is provided and includes receiving, with a server, a session initiation request from a client to initiate a stateful session for a client application. The method further includes sending, with the server, an initial server response to the client in response to the session initiation request, the initial server response including instructions for the client application and at least one configuration parameter to be used during the stateful session. In other features, the method further includes determining, with the server, whether the client has approved the at least one configuration parameter. In other features, the method further includes sending, with the server, a subsequent server response in response to a determination that the client did not approve the at least one configuration parameter, the subsequent server response including a revision to the at least one configuration parameter. In other features, the method further includes storing, with the server, session state information in a memory of the server, the session state information corresponding to a state of the client application running on the client during the stateful session.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
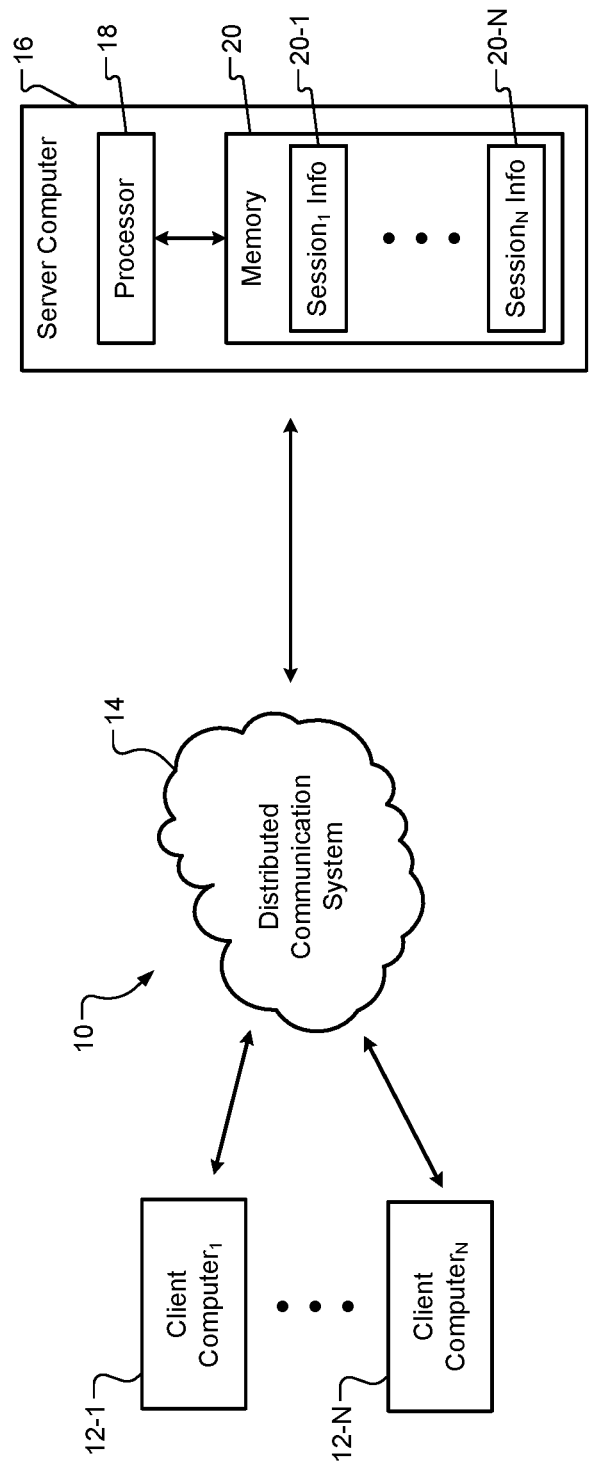
FIG. 1 is a functional block diagram of an example of a stateful cloud services system in accordance with an embodiment of the present disclosure.

Upon initiation of a stateful cloud services session, various configuration parameters must be determined and set. For example, the configuration parameters may indicate the amount of computational resources, memory resources, and storage resources allocated by the server to a particular cloud services session. For further example, the configuration parameters may indicate the manner in which the server computer communicates with the client computer during the cloud services session, such as whether Hypertext Transfer Protocol Secure (HTTPS) communication or WebSocket communication will be used for the session. For further example, when the client computer is running a web application within a web browser, the configuration parameters may indicate the particular features to be included and enabled in the web application for the cloud services session. For further example, the configuration parameters may indicate the manner in which graphics are displayed by the web browser of the client computer during the session.

Traditionally, the configuration parameters for a particular cloud services session would be set by default by the server computer without input from the particular client computer. Configuration parameters set in this manner, however, can result in server side resources being over allocated or under allocated for a particular cloud services session. Additionally, configuration parameters set in this manner can also result in a mismatch between the configuration parameters set by the server computer and the actual capabilities of the client computer participating in the cloud services session.

To address the above issues, the present disclosure provides systems and methods for bidirectional negotiation of structured configuration parameters for stateful server/client systems. In particular, the present disclosure provide mechanisms by which the server computer and client computer can communicate and negotiate the most appropriate set of configuration parameters for the cloud services session, thereby resulting in a more efficient allocation and use of server resources and in a set of configuration parameters that match the capabilities of the server computer and client computer participating in the cloud services session.

As discussed in further detail below, the systems and methods of the present disclosure allow the server computer and client computer to negotiate and jointly determine the set of configuration parameters that will govern the cloud services session at the outset of the session. In addition, the server computer and client computer can communicate throughout the session to update and revise the configuration parameters, as appropriate, to reflect the state and conditions of the session, the server computer, and/or the client computer. As such, the systems and methods of the present disclosure beneficially allow for: the optimistic runtime adjustment of allocated resources during the cloud services session; the trimming of previously reserved but unused server computer resources; and dynamic communication protocol switching (e.g., HTTPS to WebSockets, and vice-versa) during the cloud services session based on factors during the session. Additionally, the systems and methods of the present disclosure also allow for the graceful degradation of functionality offered to the client computer based on the capabilities of the client computer and/or user information. As discussed in further detail below, the systems and methods of the present disclosure allow the server computer and client computer to negotiate and jointly determine a number of configuration parameters to narrowly tailor the configuration parameters used during the cloud services session to most effectively and efficiently utilize the available resources for the server computer and the client computer during the cloud services session.

With reference to FIG. 1, a stateful cloud services system 10 includes: client computers 12-1 to 12-N; a distributed communication system 14; and a server computer 16. While the example of FIG. 1 shows a single server computer 16, multiple server computers 16, distributed throughout one or more data centers, can be used. As shown in FIG. 1, and discussed in further detail below, the server computer 16 includes one or more processors 18 in communication with a memory 20. The memory 20 stores session information 20-1 to 20-N corresponding to multiple cloud services sessions being hosted by the server computer. For example, in the example of FIG. 1, the server computer 16 is storing session information 20-1 to 20-N corresponding to on-going cloud services sessions with each of the client computers 12-1 to 12-N, respectively.

Web applications, including web authoring tools, for example, can run within a web browser of each of the client computers 12-1 to 12-N that are in communication with the server computer 16 during a cloud services session. Additionally or alternatively, the client computers 12-1 to 12-N can run applications installed on the client computers for execution outside of a web browser. During the cloud services sessions, the server computer 16 can provide code and content to the client computers 12-1 to 12-N to run the web applications in the web browsers of the client computers 12-1 to 12-N or to run the separate applications running on the client computers 12-1 to 12-N. For further example, an application design tool, such as PowerApps®, can be run within a web browser and used to create a mobile application, for example, for a mobile device. During an application design session, a user can drag user interface elements, such as sliders, buttons, and text, onto a blank canvas within the web browser to design and build a mobile application. While the web application is running on the client computers 12-1 to 12-N, such as in the web browser of the client computers 12-1 to 12-N, the client computers 12-1 to 12-N are in communication with the server computer 16 and receive code and content for the web application based on user input received by the client computers 12-1 to 12-N. In addition, during the cloud services session for each of the client computers 12-1 to 12-N, the server computer 16 stores and updates the session information 20-1 to 20-N corresponding to the state of the web application running in the web browsers of each of the client computers 12-1 to 12-N. Similarly, if a separate application is running on the client computers 12-1 to 12-N, during the cloud services session for each of the client computers 12-1 to 12-N, the server computer 16 stores and updates the session information 20-1 to 20-N corresponding to the state of the application running on each of the client computers 12-1 to 12-N.

The distributed communication system 14 includes routers, which direct packets between the client computers 12-1 to 12-N and the server computer 16. The distributed communication system 14 may include a network, such as the Internet, a local area network (LAN), a wireless local area network (WLAN), and/or a wide area network (WAN) such as the Internet.

Figure 2:
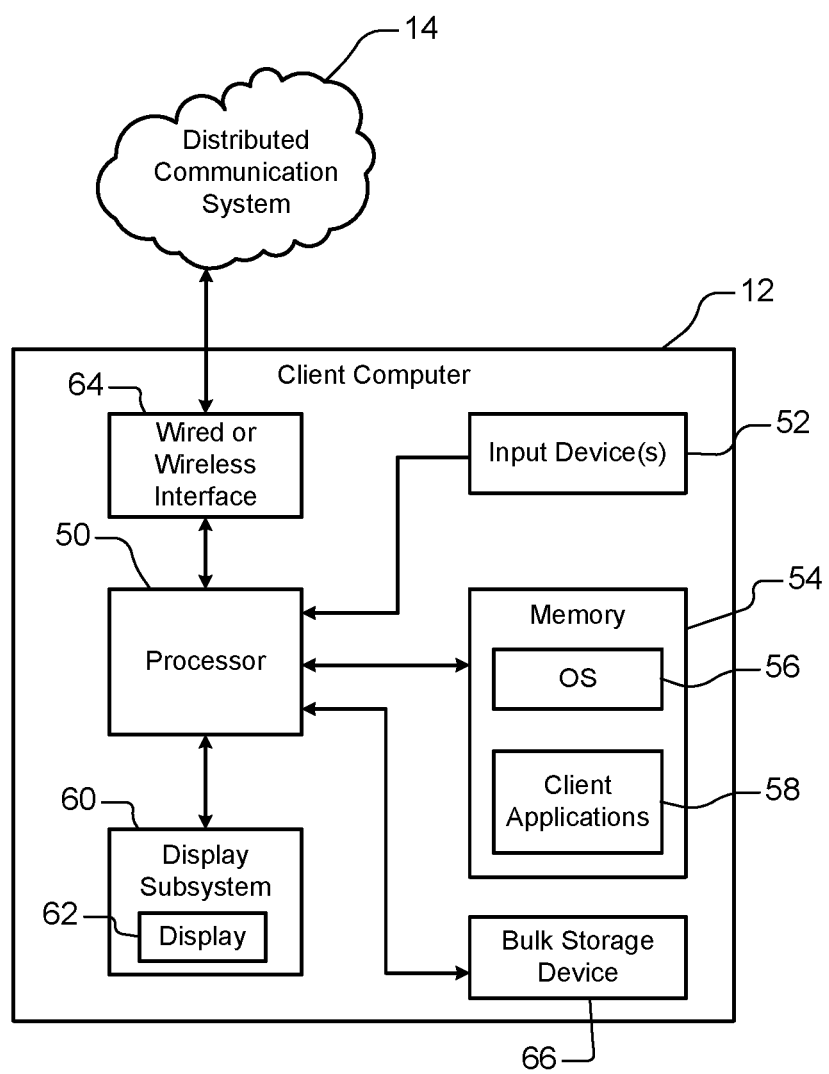
FIG. 2 a functional block diagram of an example of a client computer in accordance with an embodiment of the present disclosure.

In FIG. 2, a simplified example of a client computer 12 is shown. The client computer 12 includes a central processing unit (CPU) or processor 50 and an input device 52 such as a keypad, touchpad, mouse, etc. The client computer 12 further includes memory 54 such as volatile or nonvolatile memory, cache, or other type of memory. The client computer 12 further includes a bulk storage device 66 such as flash memory, a hard disk drive (HDD) or other bulk storage device. Each of the client computers 12-1 to 12-N illustrated in FIG. 1 can be implemented as a client computer 12 illustrated in FIG. 2.

The processor 50 of the client computer 12 executes an operating system (OS) 56 and one or more client applications 58. For example, the client applications 58 may include a web browser and a web application running in the web browser. The web application may include, for example, code for the client computer to execute the methods of the present disclosure, including for example, the methods described in further detail below with respect to FIGS. 4, 6, and 9. The client applications 58 may also include an application executed by the client computer 12 outside of a web browser, which includes, for example, code for the client computer to execute the methods of the present disclosure, including the methods described in further detail below with respect to FIGS. 4, 6, and 9. The client computer 12 further includes a wired interface (such as an Ethernet interface) and/or wireless interface (such as a Wi-Fi, Bluetooth, near field communication (NFC) or other wireless interface (collectively identified at 64)) that can establish a communication channel over the distributed communication system 14. The client computer 12 further includes a display subsystem 60 including a display 62.

Figure 3:
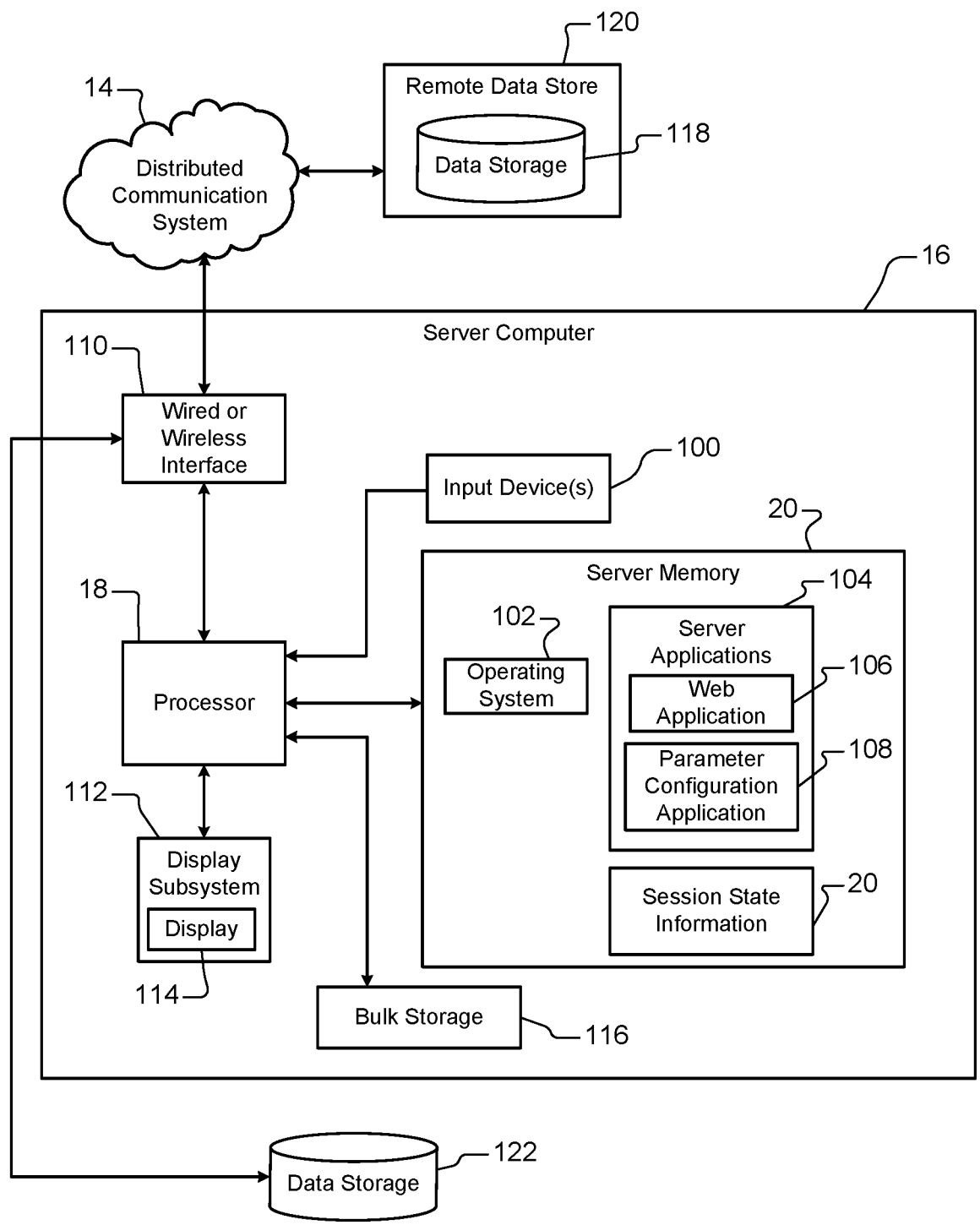
FIG. 3 is a functional block diagram of an example of a server computer incorporating applications in accordance with an embodiment of the present disclosure.

In FIG. 3, an example of a server computer 16 is shown. As mentioned above, although a single server computer 16 is shown in FIGS. 1 and 3, the systems and methods of the present disclosure can be utilized with multiple server computers 16 dispersed between one or more data centers located, for example, at different geographic locations. The server computer 16 includes one or more processors 18 and an input device 100 such as a keypad, touchpad, mouse, etc. The server computer 16 further includes server memory 20 such as volatile or nonvolatile memory, cache, or other type of memory. The one or more processors 18 executes an operating system (OS) 102 and one or more server applications 104. An example of a server application 104 includes a web application 106 that provides code and content to a web browser of a client computer 12. For example, the web application 106 may include server code for the server computer 16 to run a server side of the web application 106. The server computer 16 may provide client code to a client computer 12 to execute a client side of the web application 106 in the web browser of the client computer 12 or to run as a separate application outside of a web browser. Another example of a server application 104 includes a parameter configuration application 108 for negotiating configuration parameters with a client computer 12 for utilization during a cloud services session, as discussed in further detail below, for example, with reference to FIGS. 5, 7, and 8. The server memory 20 also stores session state information 20 corresponding to the current state of each of the client computers 12-1 to 12-1 that are currently running the client side of the web application 106 and have an active session open with the server computer 16. For example the session state information 20 illustrated in FIG. 3 corresponds to the session information 20-1 to 20-N for each of the client computers 12-1 to 12-N illustrated in FIG. 1.

The server computer 16 further includes a wired or wireless interface 110 that establishes a communication channel over the distributed communication system 14. The server computer 16 further includes a display subsystem 112 that includes a display 114. The server computer 16 may further include a bulk storage device 116 such as flash memory, a hard disk drive (HDD), or other local or remote storage device. The one or more processors 18 may also access a remote data storage 118 of a remote data store 120 via the interface 110 and the distributed communication system 14, or a data storage 122, such as a database, via the interface 110.

Figure 4:
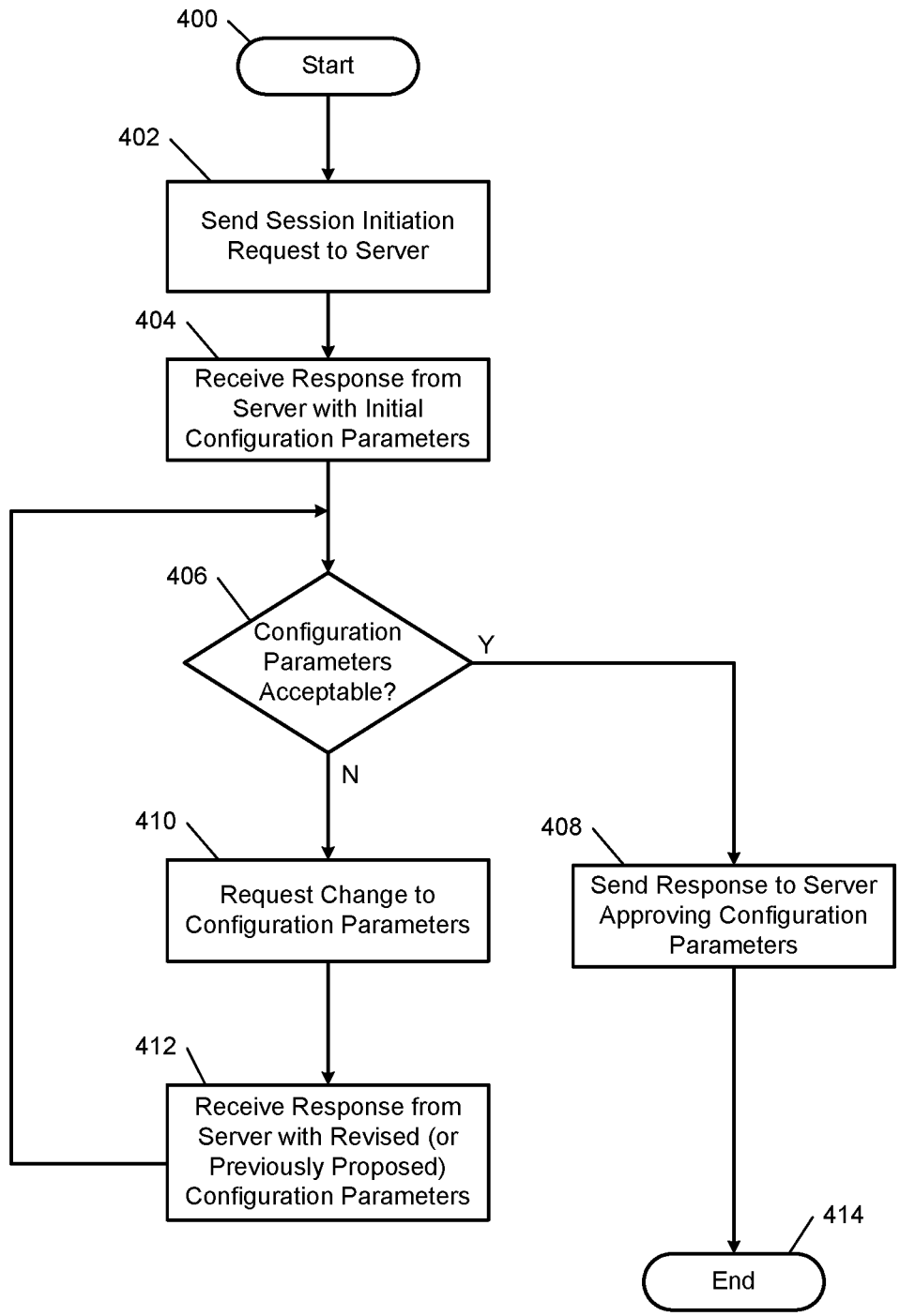
FIG. 4 illustrates a stateful cloud services method in accordance with an embodiment of the present disclosure.

Operations of the client computers 12-1 to 12-N and server computer 16 are further described below with respect to the methods of FIGS. 4-9. An example of a stateful cloud services method is illustrated in FIG. 4. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 4 can be executed by each of the client computers 12-1 to 12-N and begins at 400. At 402, the client computer 12 sends a session initiation request to the server computer 16. For example, the session initiation request may be a standard Hypertext Transfer Protocol (HTTP) request, such as a "GET" request for the web application root page. For further example, the session initiation request may be a standard HTTP GET request addressed to a global endpoint address associated with the server computer 16.

At 404, the client computer 12 receives the response from the server computer 16. For example, the response from the server computer 16 can include Hypertext Markup Language (HTML) content and code for the web application. Additionally or alternatively, the response from the server computer 16 can include other content, including non-HTML content. In addition, for further example, the response from the server computer 16 can include code to establish an additional session for an additional service, which may or may not include HTML content. The present teachings can also be applied to the additional session for the additional service. In addition, as described in further detail below with reference to FIG. 5, the response also includes a set of configuration parameters determined by the server computer 16 for use during the particular session. As discussed in further detail below with reference to FIG. 5, the server computer 16 can generate and determine the set of configuration parameters for the cloud services session based on, for example, information about the client computer 12, information about the server computer 16, information about a user using the client computer 12, and other available information related to the cloud services session. As discussed in further detail below with reference to FIG. 5, the server computer 16 can, for example, generate JavaScript® code that defines the set of configuration parameters determined by the server computer 16 and can send the response to the client computer 12 using an HTML <script> tag that includes the JavaScript® code that defines the configuration parameters set by the server computer 16.

At 406, the client computer 12 determines whether the configuration parameters received from the server computer 16 are acceptable. As mentioned above, the response received from the server computer 16 at step 404 includes the HTML content and code for the web application run, for example, in the web browser of the client computer 12. The code includes, for example, code that allows the client computer 12 to determine whether the configuration parameters set by the server computer 16 are acceptable based on the current computing capabilities and computing environment of the client computer 12. For example, the configuration parameters received from the server computer 16 may include settings that are incompatible with the settings of the client computer 12. For further example, the configuration parameters may allocate a relatively low amount of computational resources, memory resources, and/or storage resources on the server computer 16 for the client computer 12 to use during the cloud services session. The client computer 12, however, may determine that a larger project is being, or will be, initiated by the user and may determine that a larger amount of computational resources, memory resources, and/or storage resources on the server computer 16 would be more appropriate for the cloud services session. For further example, the configuration parameters may include settings for features and/or capabilities that are not compatible with or not available on the client computer 12. For example, the configuration parameters may include settings indicating that Scalable Vector Graphics (SVG) will be used during the cloud services session, while the client computer 12 may not support SVG.

At 406, when the client computer 12 determines that the configuration parameters received from the server computer 16 are acceptable, the client computer 12 proceeds to 408. At 408, the client computer 12 can send a response to the server computer 16 approving the previously received configuration parameters. Alternatively, the system can be configured such that when a response is not sent by the client computer 12 for a predetermined time period, for example, the server computer 16 can simply determine, based on the lack of response, that the configuration parameters were determined to be acceptable by the client computer. In which case, step 308 can be omitted and the client computer 12 can simply proceed directly to 414 when the client computer determines that the configuration parameters received from the server computer 16 are acceptable. The method then ends at 414.

At 406, when the client computer 12 determines that the configuration parameters received from the server computer 16 are not acceptable, the client computer 12 proceeds to 410 and generates a request to the server computer 16 to change the configuration parameters. For example, the client computer 12 can generate a request to modify the previously received configuration parameters from the server computer 16 to more appropriately match the capabilities and current computing environment of the client computer 12. The request to modify the previously received configuration parameters may be sent by the client computer 12 as an XMLHttpRequest (XHR).

At 412, the client computer 12 receives a response from the server computer 16. The response may include a revised set of configuration parameters, based on the previous request from the client computer 12. Alternatively, if the server computer 16 was unable to accommodate the client computer's request, the response may include the same configuration parameters that were previously proposed by the server computer 16.

Upon receipt of the revised (or previously proposed) configuration parameters from the server computer 16, the client computer 12 proceeds to 406 and again determines whether the configuration parameters are acceptable. For example, if the client computer's request for a particular revision to the configuration parameters was denied by the server computer 16 and the server computer simply resent the original configuration parameters or some portion of the original configuration parameters, the client computer 12 may now accept the original configuration parameters, or that portion of the original configuration parameters. In other words, the client computer 12 may attempt to request adjustment to the original configuration parameters and, in the event the request is denied, may simply accept the originally proposed configuration parameters. Alternatively, the client computer 12 may make a further request to adjust the proposed configuration parameters. Steps 406, 410, and 412 are iteratively repeated by the client computer 12 until the configuration parameters received from the server computer 16 are acceptable. At that point, the client computer 12 sends the response to the server computer 16 approving the configuration parameters at 408 and ends at 414. Alternatively, as mentioned above, the client computer 12 may simply proceed to 414 and end the method without sending the response at 408 once the client computer 12 determines that the configuration parameters received from the server computer 16 are acceptable.

Figure 5:
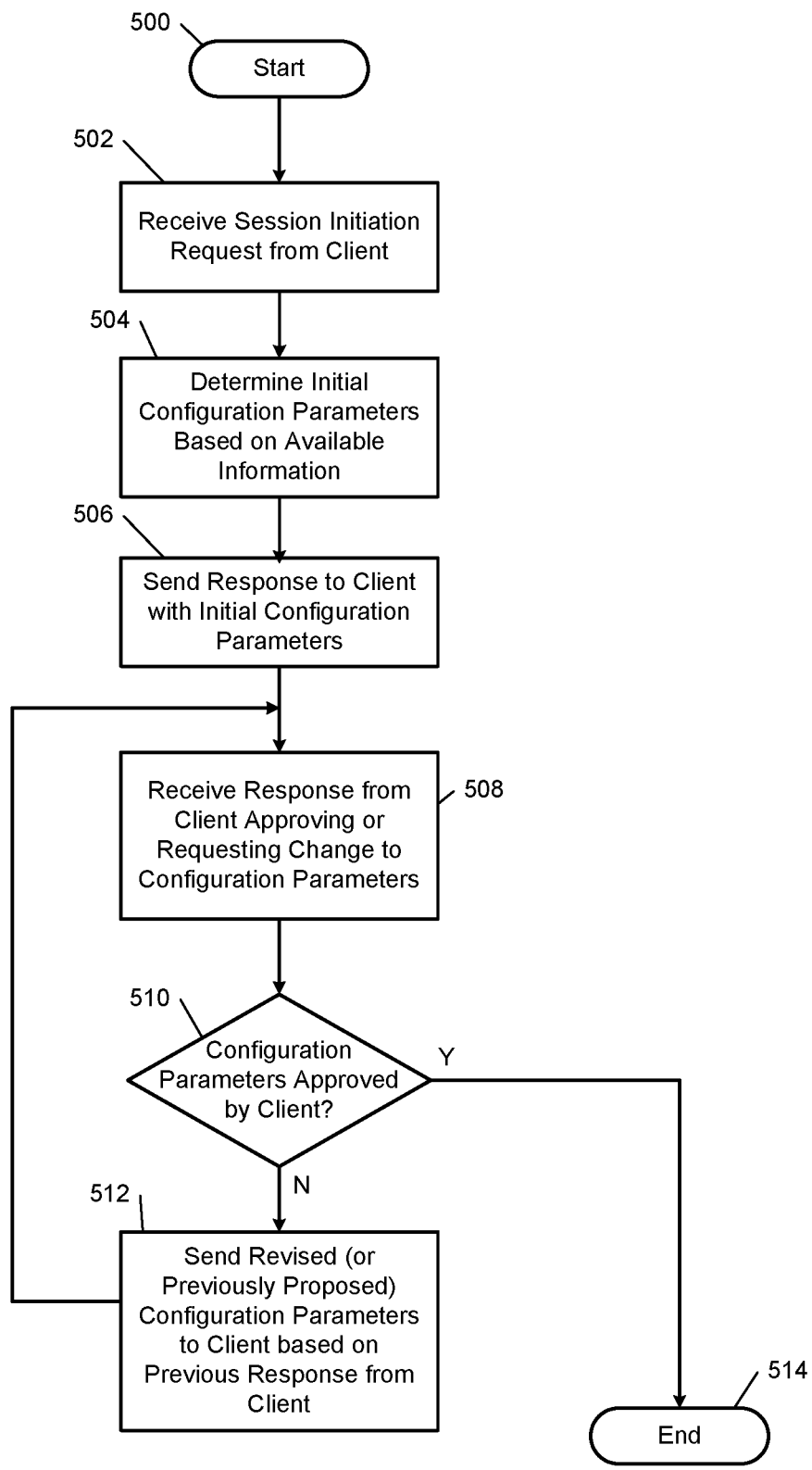
FIG. 5 illustrates a stateful cloud services method in accordance with an embodiment of the present disclosure.

Another example of a stateful cloud services method is illustrated in FIG. 5. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 5 is executed by a server computer 16 and begins at 500. At 502, the server computer 16 receives a request from a client computer 12 to initiate a stateful session. As mentioned above with respect to step 402 of FIG. 4, the request from the client computer 12 can be a standard HTTP request, such as a GET request for the web application root page, and may be addressed to a global endpoint address associated with the server computer 16.

At 504, the server computer 16 determines the initial configuration parameters for the cloud services session based on currently available information about, for example, the client computer 12, a user of the client computer, the server computer 16, the current computing load of the server computer 16, the network communication environment with the client computer 12, and/or any other applicable factors or information related to or that could affect the cloud services session. For example, the server computer 16 may receive information about the capabilities of the client computer 12, such as the current browser type or version running on the client computer 12, a version of a web application running on the client computer 12, a screen resolution of the client computer 12, a graphics capability of the client computer 12, such as whether SVG or bitmaps is supported, whether http/2 is supported by the client computer 12, and/or other applicable information about the capabilities of the client computer 12. For further example, the server computer 16 may receive information about optional features enabled in the web application running on the client computer 12. For further example, the server computer 16 may receive information about the anticipated amount of resources projected to be utilized by the client computer 12 during the session. For example, the client computer 12 may indicate that the project associated with the cloud services session will only be a relatively smaller project and will not require a large amount of resources, such as computational resources, memory resources, and storage resources. Alternatively, the client computer 12 may indicate that the project associated with the cloud services session will be a relatively larger project and will require a relatively large amount of resources. For further example, the server computer 16 may receive information about a user of the client computer 12 such as, for example, a login identification associated with the user. The server computer 16 may determine, for example, a projected expertise level of the user of the client computer 12 based on the user information. For further example, the server computer 16 may also determine the current computing load on the server computer 16 based on, for example, the current number of sessions being hosted on the server computer 16 and the amount of resources already allocated to those other sessions.

Based on some or all of the above described information, the server computer 16 at 504 determines an initial set of configuration parameters. At 506, the server computer sends the generated initial set of configuration parameters to the client computer 12. For example, the server computer 16 can generate JavaScript® code that defines the set of configuration parameters determined by the server computer 16 and can send the response to the client computer 12 using an HTML <script> tag that includes the JavaScript® code that defines the configuration parameters set by the server computer 16.

At 508, the server computer 16 receives a response from the client computer 12 either approving the proposed set of configuration parameters or, for example, requesting changes to the configuration parameters. Alternatively, as discussed above, the system may be configured such that the client computer 12 does not send a response once the configuration parameters are approved and only sends a response when the configuration parameters are not approved and/or changes to the configuration parameters are requested. In which case, instead of receiving a response from the client computer 12 at 508, the server computer 16 may simply wait a predetermined time period and, when a response is not received from the client computer 12 during the predetermined time period, the server computer 16 may determine that the client computer has approved the configuration parameters and proceed to 510.

At 510, the server computer 16 determines whether the client computer 12 approved the proposed set of configuration parameters. At 510, when the client computer 12 did not approve the configuration parameters, the server computer 16 proceeds to 512. At 510, when the client computer 12 approved the configuration parameters, the server computer 16 proceeds to 514 and the method ends.

At 512, when the client computer 12 did not approve the previously sent set of configuration parameters, the server computer 16 may determine whether it can accommodate the client computer's request for revised configuration parameters. If so, the server computer 16 may generate a revised set of configuration parameters based on the request for revised configuration parameters from the client computer 12 and based on the previously received information about the client computer 12, the user of the client computer 12, the server computer 16, etc. At 512, when the server computer 16 is not able to accommodate the client computer's request for revised configuration parameters, the server computer 16 may simply resend the previously sent set of configuration parameters and indicate that the client computer's request cannot be accommodated. The server computer 16 then loops back to 508 and waits for the client computer 12 to either approve the most recently sent set of configuration parameters, via a response or a lack of response during a predetermined time period, or request further changes. The server computer 16 iteratively repeats steps 508, 510, and 512 until the client computer 12 approves a set of configuration parameters and the method ends at 514.

In this way, the server computer 16 and the client computer 12 are able to negotiate and agree upon an initial set of configuration parameters for a cloud services session based on available information about the client computer 12, the server computer 16, the user of the client computer 12, the computing environments of the server computer 16 and the client computer 12, and any other factors that may affect the cloud services session. Once the initial set of configuration parameters is agreed upon, the cloud services session proceeds, for example, with a web application running in a web browser of the client computer 12 and with the server computer 16 providing code and content for the web application to the client computer 12 and storing state information for the session in the memory 20 of the server computer 16.

As discussed in further detail below with reference to FIGS. 6-9, during the cloud services session, the client computer 12 or the server computer 16 can initiate an adjustment of the configuration parameters. For example, either the client computer 12 or the server computer 16 can increase or decrease the amount of resources, i.e., computational resources, memory resources, and/or storage resources, allocated to the cloud services session. In particular, an adjustment of the configuration parameters that is initiated by the client computer 12 is discussed in further detail below with reference to FIGS. 6 and 7. Likewise, an adjustment of the configuration parameters that is initiated by the server computer 16 is discussed in further detail below with reference to FIGS. 8 and 9.

Figure 6:
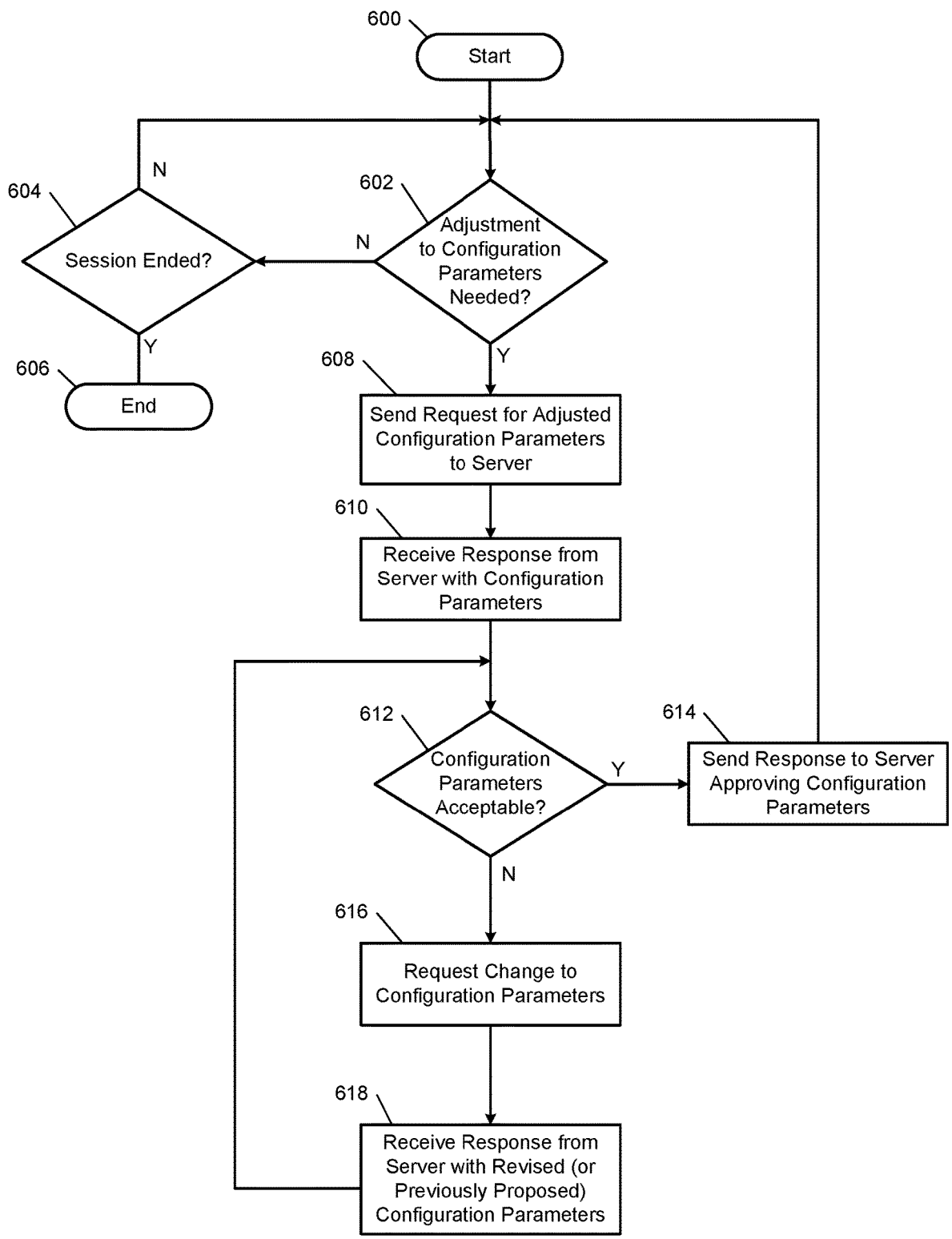
FIG. 6 illustrates a stateful cloud services method in accordance with an embodiment of the present disclosure.

Another example of a stateful cloud services method is illustrated in FIG. 6. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 6 is executed by a client computer 12 and begins at 600. At 602, the client computer 12 determines whether an adjustment to the configuration parameters is needed. For example, the client computer 12 may determine that the initially allocated amount of resources in insufficient for the current cloud services session and may determine that additional resources are needed. For further example, the client computer 12 may indicate that communication latency is increasing and that the cloud services session would benefit from communication using a WebSockets connection as opposed to continuing communication using HTTPS communication. At 602, when the client computer 12 determines that an adjustment to the configuration parameters is needed, the client computer proceeds to 608.

At 602, when the client computer 12 determines that an adjustment to the configuration parameters is not needed, the client computer 12 proceeds to 604 and determines whether the session has ended. At 604, when the session has ended the client computer 12 proceeds to 606 and the method ends. Otherwise, the client computer 12 loops back to 602. In this way, the client computer 12 iteratively repeats steps 602 and 604 until either an adjustment of the configuration parameters is needed or the session ends.

At 602, when an adjustment to the configuration parameters is needed, the client computer 12 proceeds to 608. At 608, the client computer 12 sends a request for adjusted configuration parameters to the server computer 16. The request, for example, may indicate that additional or fewer resources are necessary, that a different communication protocol is desired, or any other change to the current set of configuration parameters is desired.

At 610, the client computer 12 receives the response from the server computer 16 with a set of configuration parameters. When the server computer 16 was able to accommodate the client computer's request, in whole or in part, the received configuration parameters will be different from the previous set of configuration parameters. When the server computer 16 was not able to accommodate the client computer's request, at least in part, the configuration parameters will be the same as the previous set of configuration parameters, or the response will simply indicate that the request cannot be accommodated.

At 612, the client computer 12 determines whether the received set of configuration parameters is acceptable. If so, the client computer 12 proceeds to 614 and sends a response to the server approving the configuration parameters. Alternatively, the system can be configured such that when a response is not sent by the client computer 16 for a predetermined time period, for example, the server computer 16 can simply determine, based on the lack of response, that the configuration parameters were determined to be acceptable by the client computer. In which case, step 614 can be omitted and the client computer 12 can simply proceed directly back to 602 when the client computer determines that the configuration parameters received from the server computer 16 are acceptable. Otherwise, the client computer 12 proceeds to 616 and requests a change to the configuration parameters.

At 614, once the client computer 12 approves the configuration parameters, the client computer 12 loops back to 602 and continues to monitor whether adjustments to the configuration parameters are needed.

At 616, after requesting a change to the configuration parameters, the client computer 12 proceeds to 618 and receives the response from the server computer 16 with either revised configuration parameters (if the server computer 16 was able to further adjust the configuration parameters) or with the previously proposed configuration parameters (if the server computer 16 was not able to further adjust the configuration parameters). The client computer 12 then loops back to 612 and determines whether the configuration parameters are acceptable. In this way, the client computer 12 iteratively repeats steps 612, 616, and 618 until the configuration parameters are acceptable, in which case the client computer 12 proceeds to 614 and sends a response to the server computer 16 approving the configuration parameters. Alternatively, as mentioned above, the client computer 12 may simply proceed to 602 without sending the response at 614 once the client computer 12 determines that the configuration parameters received from the server computer 16 are acceptable.

Figure 7:
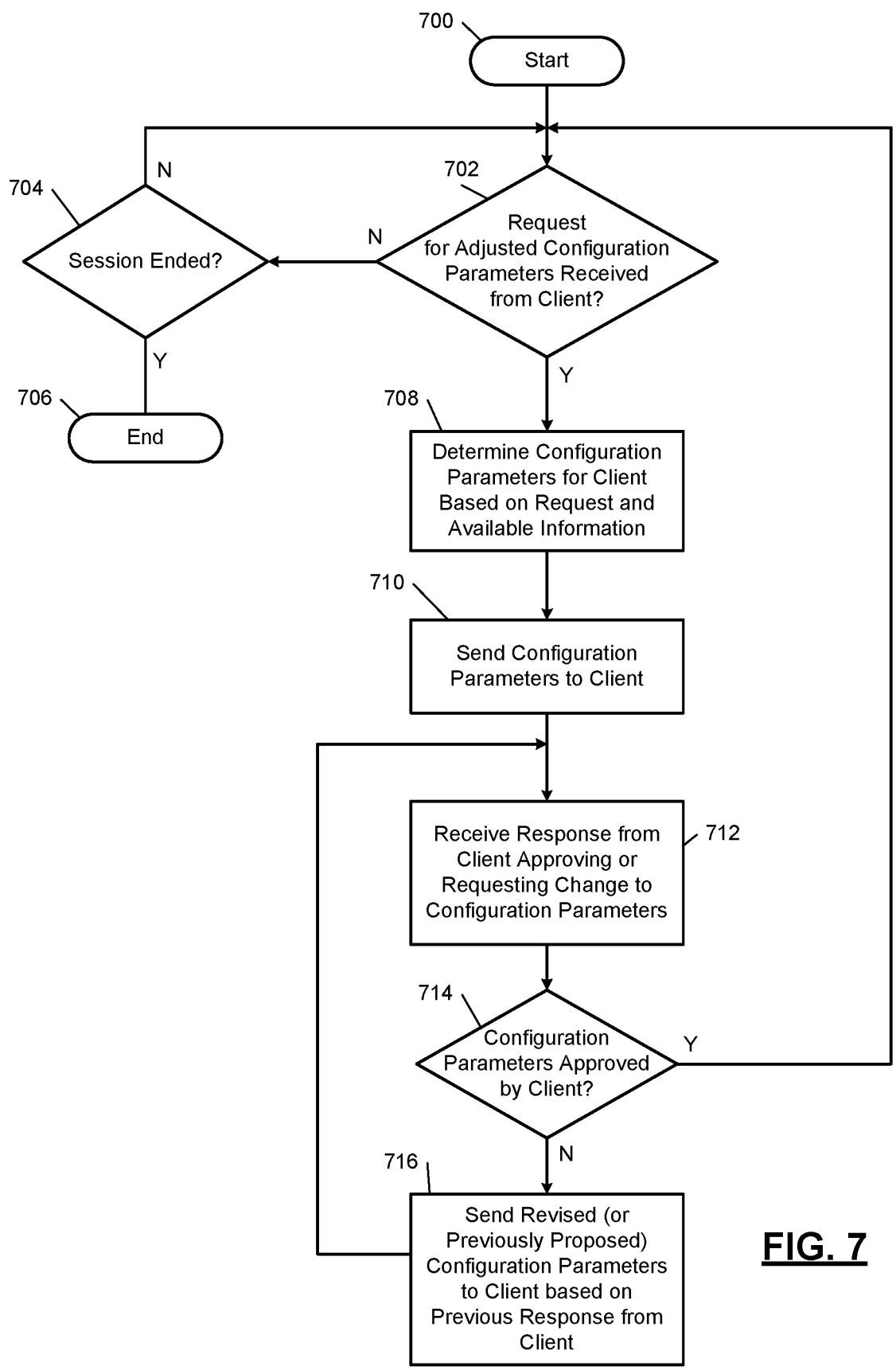
FIG. 7 illustrates a stateful cloud services method in accordance with an embodiment of the present disclosure.

Another example of a stateful cloud services method is illustrated in FIG. 7. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 7 is executed by a server computer 16 and begins at 700. At 702, the server computer 16 determines whether a request for adjusted configuration parameters has been received from the client computer 12. For example, the request for adjusted configuration parameters from the client computer 12 is discussed above with reference to step 608 of FIG. 6.

At 702, when the server computer 16 has not received a request for an adjustment to the configuration parameters from the client computer 12, the server computer 16 proceeds to 704 and determines whether the session has ended. At 704, when the session has ended the server computer proceeds to 706 and the method ends. Otherwise, the server computer 16 loops back to 702. In this way, the server computer 16 iteratively repeats steps 702 and 704 until either a request for an adjustment of the configuration parameters is received or the session ends.

At 702, when the server computer 16 receives a request from the client computer 12 for an adjustment to the configuration parameters, the server computer 16 proceeds to 708. At 708, the server computer 16 determines configuration parameters for the client computer 12 based on the request from the client computer 12 and based on all of the available information about the client computer 12, the server computer 16, the user of the client computer 12, and the computing environment of the cloud services session, as discussed in detail above. If the server computer 16 is able to accommodate the client computer's request for an adjustment of the configuration parameters, the server computer 16 will then send the updated configuration parameters to the client computer 12 at 710. If the server computer 16 is not able to accommodate the client computer's request, the server computer 16 will simply send the previous configuration parameters to the client computer at 710 or send a message indicating to the client computer 12 that the request for adjusted configuration parameters could not be accommodated.

At 712, the server computer 16 receives a response from the client computer 12 either approving the configuration parameters sent at 710 or requesting changes to the configuration parameters sent at 710. Alternatively, as discussed above, the system may be configured such that the client computer 12 does not send a response once the configuration parameters are approved and only sends a response when the configuration parameters are not approved and/or changes to the configuration parameters are requested. In which case, instead of receiving a response from the client computer 12 at 712, the server computer 16 may simply wait a predetermined time period and, when a response is not received from the client computer 12 during the predetermined time period, the server computer 16 may determine that the client computer has approved the configuration parameters and proceed to 714. At 714, the server computer 16 determines whether the client computer 12 approved the previously sent configuration parameters. At 714, when the previously sent configuration parameters were approved, the server computer 16 loops back to 702 and continues to monitor whether a request for adjusted configuration parameters has been received from the client computer 12.

At 714, when the previously sent configuration parameters were not approved by the client, the server computer 16 proceeds to 716 and either sends a revised set of configuration parameters to the client computer 12 (if the server computer 16 is able to further adjust the configuration parameters) or resends the previously sent set of configuration parameters (if the server computer 16 is not able to further adjust the configuration parameters). The server computer 16 then loops back to 712 and waits for the client computer 12 to either approve the most recently sent set of configuration parameters, via a response or a lack of response during a predetermined time period, or request further changes. In this way, the server computer 16 iteratively repeats steps 712, 714, and 716 until the configuration parameters are approved by the client computer 12.

Figure 8:
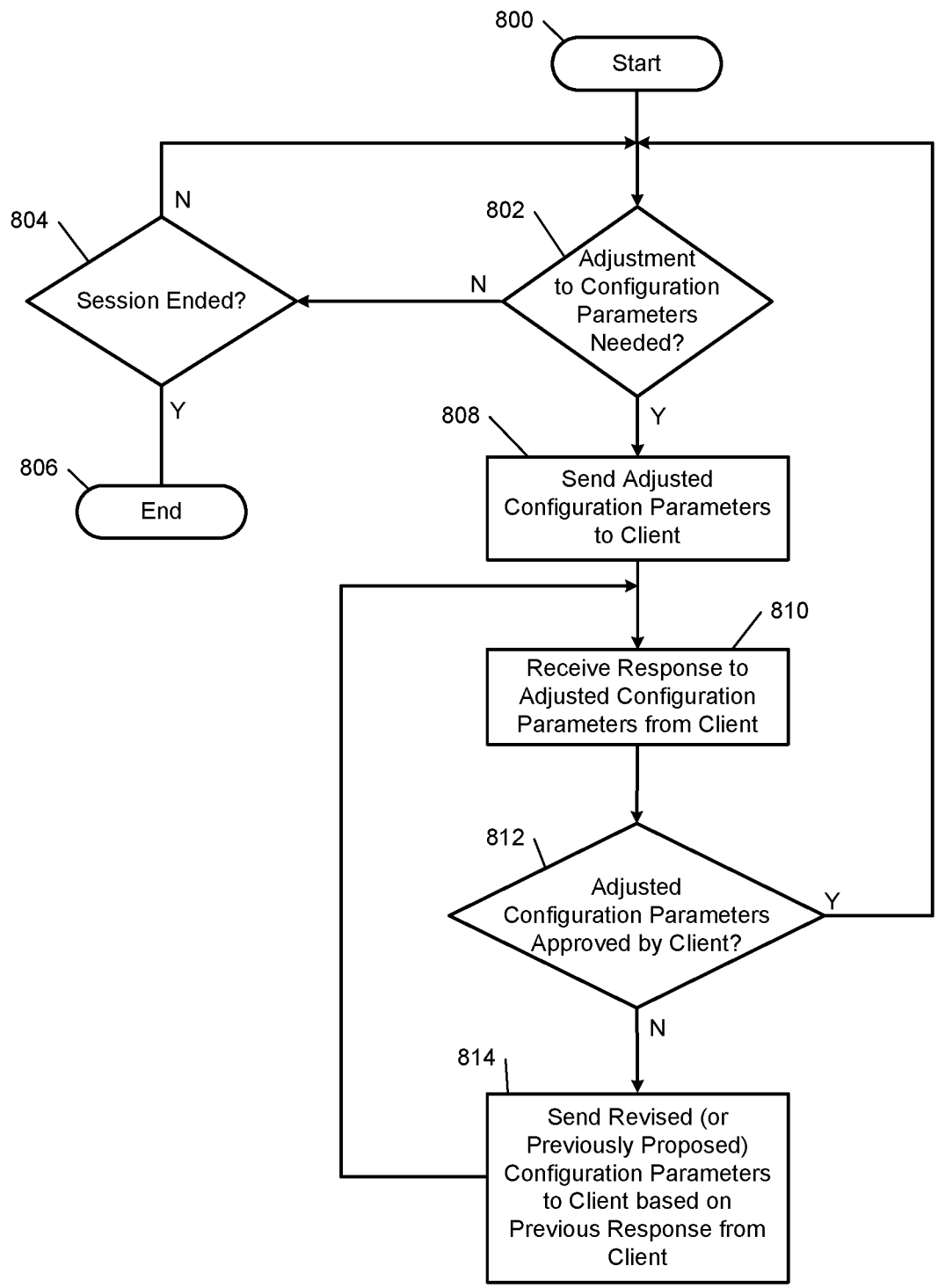
FIG. 8 illustrates a stateful cloud services method in accordance with an embodiment of the present disclosure.
Figure 9:
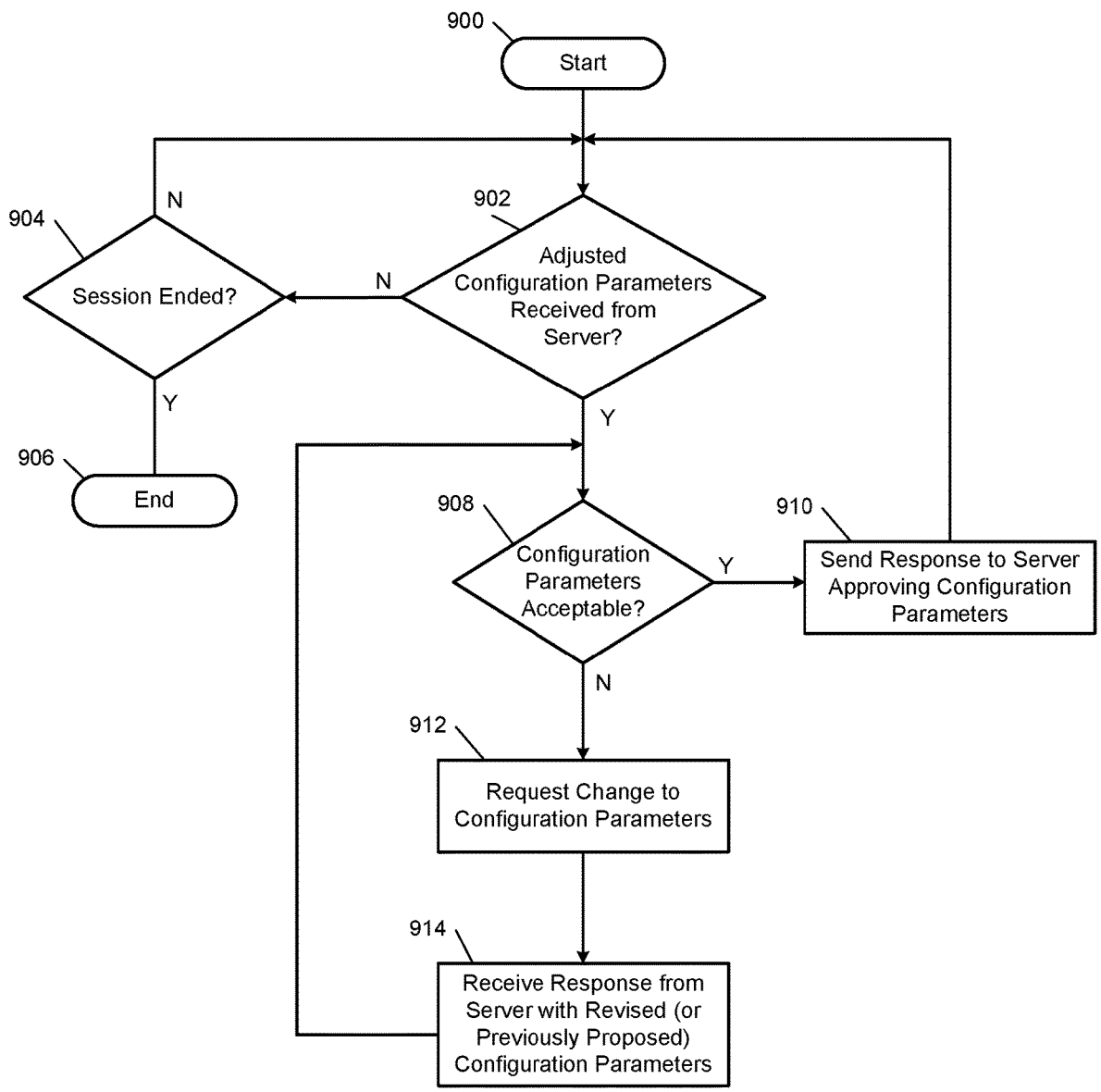
FIG. 9 illustrates a stateful cloud services method in accordance with an embodiment of the present disclosure.

As noted above, FIGS. 6 and 7 illustrate configuration parameter adjustment that is initiated by the client computer 12 and FIGS. 8 and 9 illustrate configuration parameter adjustment that is initiated by the server computer 16.

Specifically, another example of a stateful cloud services method is illustrated in FIG. 8. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 8 is executed by a server computer 16 and begins at 800. At 802, the server computer 16 determines whether an adjustment to the configuration parameters for the cloud services session is needed. For example, the server computer 16 may determine that the initially allocated amount of resources for a cloud services session needs to be increased or decreased. For example, if the project associated with a particular cloud services session is more complicated and resource intensive than originally anticipated, the server computer 16 may determine that the amount of resources, such as the allocation of computational resources, memory resources, and/or storage resources, should be increased. Likewise, if the project associated with a particular cloud services session is less complicated and resource intensive, the server computer 16 may determine that the amount of allocated resources for the cloud services sessions should be decreased. Additionally, if the server computer 16 experiences an increased demand in resources across all currently existing cloud services sessions being serviced by the server computer 16, the server computer 16 may need to decrease the resource allocation for one or more cloud services sessions to be able to properly maintain all cloud services sessions running on the server computer 16.

At 802, when the server computer 16 determines that an adjustment to the configuration parameters is not needed, the server computer 16 proceeds to 804 and determines whether the session has ended. At 804, when the session has ended the server computer 16 proceeds to 806 and the method ends. Otherwise, the server computer 16 loops back to 802. In this way, the client computer 12 iteratively repeats steps 802 and 804 until either an adjustment of the configuration parameters is needed or the session ends.

At 802, when the server computer 16 determines that an adjustment to the configuration parameters is needed, the server computer 16 proceeds to 808. At 808, the server computer 16 determines the new set of configuration parameters and sends them to the client computer 12. At 810, the server computer 16 receives a response to the adjusted configuration parameters from the client computer 12 indicating whether the new configuration parameters have been approved by the client computer. Alternatively, as discussed above, the system may be configured such that the client computer 12 does not send a response once the configuration parameters are approved and only sends a response when the configuration parameters are not approved and/or changes to the configuration parameters are requested. In which case, instead of receiving a response from the client computer 12 at 810, the server computer 16 may simply wait a predetermined time period and, when a response is not received from the client computer 12 during the predetermined time period, the server computer 16 may proceed to 812 and determine that the client computer has approved the configuration parameters.

At 812, the server computer 16 determines whether the new configuration parameters have been approved by the client computer 12. At 812, when the new configuration parameters have been approved by the client computer 12, the server computer 16 proceeds with the cloud services session using the new configuration parameters and loops back to 802 to continue to monitor whether adjusted configuration parameters are needed.

At 812, when the previously sent configuration parameters were not approved by the client, the server computer 16 proceeds to 814 and either sends a revised set of configuration parameters to the client computer 12 (if the server computer 16 is able to further adjust the configuration parameters) or resends the previously sent set of configuration parameters (if the server computer 16 is not able to further adjust the configuration parameters). The server computer 16 then loops back to 810 and waits for the client computer 12 to either approve the most recently sent set of configuration parameters, via a response or a lack of response during a predetermined time period, or request further changes. In this way, the server computer 16 iteratively repeats steps 810, 812, and 814 until the configuration parameters are approved by the client computer 12.

Another example of a stateful cloud services method is illustrated in FIG. 9. Although the following operations are primarily described with respect to the implementations of FIGS. 1-3, the operations may be modified to apply to other implementations of the present disclosure. The operations may be iteratively performed.

In particular, the stateful cloud services method illustrated in FIG. 9 is executed by a client computer 12 and begins at 900. At 902, the client computer 12 determines whether adjusted configuration parameters have been received from the server computer 16. For example, the adjusted configuration parameters may be sent by the server computer at step 808 of FIG. 8, as discussed in detail above.

At 902, when the adjusted configuration parameters have not been received from the server computer 16, the client computer 12 proceeds to 904 and determines whether the session has ended. At 904, when the session has ended the server computer 16 proceeds to 906 and the method ends. Otherwise, the server computer 16 loops back to 902. In this way, the client computer 12 iteratively repeats steps 902 and 904 until either an adjustment of the configuration parameters is needed or the session ends.

At 902, when the client computer 12 receives adjusted configured parameters from the server computer 16, the client computer 12 proceeds to 908 and determines whether the adjusted configuration parameters are acceptable. For example, if the server computer 16 is proposing to decrease the amount of resources allocated to the cloud services session, but the client anticipates that the amount of resources needed is about to increase, the client computer 12 may, for example, not approve the adjusted configuration parameters and may request changes to the configuration parameters. For example, the client computer 12 may determine that a user of the web application in the web browser has a "File→Open" dialog box open to choose between a number of new project templates, indicating that the user is about to start a new project. In such case, the client computer 12 may determine that the web application is about to need additional allocated resources once the user creates the new project based on the new project template. In such case, the client computer 12 may not approve the adjusted configuration parameters from the server computer 16. At 908, based on information about the client computer 12, the web application running in the web browser, the computing environment of the client computer 12, etc., the client computer determines whether the adjusted configuration parameters from the server computer 16 are acceptable.

At 908, when the adjusted configuration parameters from the server computer 16 are acceptable, the client computer 12 proceeds to 910 and sends a response to the server computer 16 approving the adjusted configuration parameters from the server computer. Alternatively, as discussed above, the system can be configured such that when a response is not sent by the client computer 16 for a predetermined time period, for example, the server computer 16 can simply determine, based on the lack of response, that the configuration parameters were determined to be acceptable by the client computer. In which case, step 910 can be omitted and the client computer 12 can simply proceed directly back to 902 when the client computer determines that the configuration parameters received from the server computer 16 are acceptable. The client computer 12 then loops back to 902 and waits for further adjusted configuration parameters from the server.

At 908, when the adjusted configuration parameters are not acceptable to the client computer 12, the server computer 16 proceeds to 912 and requests a change to the configuration parameters.

At 912, after requesting a change to the configuration parameters, the client computer 12 proceeds to 914 and receives a response from the server computer 16 with either revised configuration parameters (if the server computer 16 was able to further adjust the configuration parameters) or with the previously proposed configuration parameters (if the server computer 16 was not able to further adjust the configuration parameters). The client computer 12 then loops back to 908 and determines whether the configuration parameters are acceptable. In this way, the client computer 12 iteratively repeats steps 908, 912, and 914 until the configuration parameters are acceptable, in which case the client computer 12 proceeds to 910 and sends a response to the server computer 16 approving the configuration parameters. Alternatively, as mentioned above, the client computer 12 may simply proceed to 902 without sending the response at 910 once the client computer 12 determines that the configuration parameters received from the server computer 16 are acceptable.

In this way, the systems and methods of the present disclosure beneficially provide for bidirectional negotiation of structured configuration parameters for stateful server/client systems. The above-described operations of FIGS. 4-9 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

One beneficial utilization of the systems and methods of the present disclosure is the optimistic runtime adjustment of allocated resources for stateful server sessions. For example, the server computer 16 may initially reserve a relatively small amount of computation resources, memory resources, and/or storage resources for a new cloud services session. For example, the computational resources may refer to the percentage of the total processor usage allocated or reserved for a particular cloud services session. Additionally or alternatively, in a multi-processor server computer 16, the computational resources may be configured such that a particular cloud services session is only handled by one of the processors of the server computer 16. Additionally or alternatively, a particular cloud services session may be allocated a specific percentage of the total processor usage of a particular processor on a multi-processor server computer 16. The memory allocation may refer to the amount of fast-access memory, for example, Random Access Memory (RAM) or volatile memory, allocated to a particular cloud services session. The storage allocation may refer to the amount of long-term or non-volatile storage allocated to a particular cloud services session. The server computer 16 may be "optimistic" in the sense that it initiates the session with an allocation that is best for the server computer 16, i.e., a cloud services session that utilizes a small amount of computational resources, memory resources, and/or storage resources.

During the cloud services session, the client computer 12 may then request additional resources, as needed. For example, for a web application that utilizes templates for projects, such as an application design tool, such as PowerApps®, a blank template may initially require a small amount of resources, while creating a project from a pre-existing template may be much more resource intensive. In such case, once a project is created from a pre-existing template, the client computer 12 may request an adjustment to the configuration parameters to increase the amount of resources allocated to the cloud services session. The request may be automatically sent by the web application once the new project is created. Alternatively, the web application may include a manual option for a user of the web application to optionally request additional resources once slow performance is noticed.

In this way, the resources of the server computer 16 can be more efficiently and effectively allocated to cloud services sessions that need the resources. As such, additional concurrent sessions can be handled by each server computer, given that only the cloud services sessions that require additional resources are actually allocated such additional resources.

Another beneficial utilization of the systems and methods of the present disclosure is the trimming of previously reserved but unused server resources. Similar to the above example, a client computer 12 may have received an allocation of resources beyond that needed for a particular cloud services session. The server computer 16, for example, may monitor the amount resources being utilized by individual cloud services sessions and may determine that a particular cloud services session is underutilizing its allocated resources. In such case, the server computer 16 may send a request to the client computer 12 with adjusted configuration parameters for a reduction of allocated resources to the particular cloud services session. As discussed in detail above, the client computer 12 can then accept or deny the proposed adjusted configuration parameters. For example, if a user of the web application current has a "File→Open" dialog box open and is choosing from a number of project templates, the client computer 12 may determine that it is about to need additional allocated resources, such that a reduction in allocated resources would not be appropriate. In such case, the client computer 12 could deny the proposed adjusted configuration parameters. If, on the other hand, the client computer 12 determines that it does not need the additional resources, it could approve the proposed adjusted configuration parameters with decreased allocated resources for the associated cloud services session.

Another beneficial utilization of the systems and methods of the present disclosure is the switching of communication protocols based on factors analyzed during a cloud services session. The server computer 16 may be able to allocate a WebSocket communication connection to a small number of cloud services sessions, with the remaining cloud services sessions utilizing HTTPS communication. Using the above described systems and methods, the server computer 16 could determine the cloud services sessions that would benefit the most from a WebSocket communication connection and could adjust the configuration parameters for the applicable cloud services sessions to allocate the limited number of WebSocket communication connections appropriately. For example, the server computer 16 could analyze the level of complication for the projects in each of the cloud services sessions being handled by the server computer 16. Additionally, the server computer 16 could request that each client computer 12 send information about the network latency currently being experienced by each client computer 12. In this way, the server computer 16 could analyze and determine which client computers 12 are experiencing higher network latency and/or also have particular complicated projects. For example, using an application design tool, such as PowerApps®, as an example, a complicated project may have a large number of user interface elements, a high number of user expressions, a high graph density, etc. Further, the server computer 16 can continue to monitor and analyze the communication connections over time to appropriately adjust the communication connections to the server computer 16.

Another beneficial utilization of the systems and methods of the present disclosure is the graceful degradation of functionality offered to the client computers 12 based on client capabilities. For example, the server computer 16 can monitor the capabilities of the client computer 12 and tailor the allocated resources and functionality, through the use of the configuration parameters, to ensure that client computers 12 are not allocated resources or functionality that they are not able to utilize. For example, a cloud services session for a client computer 12 that does not support Scalable Vector Graphics (SVG) can be configured with configuration parameters such that SVG are rendered by the server computer 16, which then sends rasterized bitmap graphics to the client computer, instead of SVG. If the client computer also does not support bitmaps, the configuration parameters for the cloud services session could be configured such that images are not used at all. As another example, if a particular client supports HTTP/2, the configuration parameters for the cloud services session could be configured such that HTTP/2 is utilized for the cloud services sessions.

As another example of the beneficial utilization of the systems and methods of the present disclosure, the configuration parameters for client side rendering frequency and pre-fetching activities can be adjusted based on the level of complexity of a particular project associated with a particular cloud services session. For example, client computer 12 and the server computer 16 can agree to adjust, i.e., reduce or increase, the frequency of the communications between the two computers based on the complexity of the particular project associated with the particular cloud services session and/or other factors related to the cloud services session. Similarly, the server computer 16 and client computer 12 may agree to adjust the configuration parameters to increase the amount of telemetry communications and/or other auxiliary information services between the two computers based on the complexity of the particular project associated with the particular cloud services sessions and/or other factors related to the cloud services session.

Another example of the beneficial utilization of the systems and methods of the present disclosure is version matching of a version of a web application and/or browser of a client computer 12 to a particular server computer 16 with server code that matches and/or that is particularly suited for the version(s) of the particular client computer 12. For example, the configuration parameters could be adjusted to ensure that a particular cloud services session is being serviced by a server computer with appropriately matching code.

As another example of the beneficial utilization of the systems and methods of the present disclosure, as discussed above, the configuration parameters can be adjusted to appropriately allocate memory and/or storage resources to avoid reboots, which can cause data loss in a stateful services session. For example, a particular cloud services session may initially be set with an initial amount of memory, such as 500 Megabytes of memory. Based on the complexity of the project and other factors, however, the server computer 16 and client computer 12 may agree to increase the memory allocation for the particular cloud services session to an increased amount, such as 750 Megabytes. Additionally or alternatively, the server computer 16 may determine that the increased memory allocation is more appropriate for new cloud services sessions and may automatically utilize the increased memory allocation, such as 750 Megabytes, for new cloud series sessions. In this way, the new cloud services sessions with the increased amount of memory may be less likely to need to be rebooted during the cloud series session.

As another example of the beneficial utilization of the systems and methods of the present disclosure, the server computer 16 and the client computer 12 can agree on configuration parameters related to embedding asset management versus linking only. For example, during a project associated with a cloud services session, a user may utilize a multimedia file. The configuration parameters can be set such that the particular file is communicated across the network and stored both in the client computer 12, as an embedded file in the web application, for example, and stored in the server computer 16 in the allocated session information 20 for the session. Alternatively, the configuration parameters can be set such that the client computer 12 and the server computer 16 utilize a link to a file share site outside of the web application.

As another example of the beneficial utilization of the systems and methods of the present disclosure, the server computer 16 and the client computer 12 can agree on configuration parameters related to the length of current session lifetime. For example, an initiated session may have a predetermined default expiration or lifetime period. For example, if appropriate, the server computer 16 and the client computer 12 can agree to extend the default session expiration or lifetime period.

As another example of the beneficial utilization of the systems and methods of the present disclosure, the configuration parameters for different cloud services sessions can be rolled out to different users/different client computers 12. The results of the rollouts using the different feature sets can be reviewed and analyzed to facilitate A-B testing of the different feature sets. For example, by adjusting the configuration parameters for different cloud series sessions, a first set of features can be rolled out to a first group of users/client computers 12 while a second set of features can be rolled out to a second group of users/client computers 12. The use of the features can then later be monitored and analyzed to determine, for example, which features in each of the feature sets were used more often or more effectively. For example, the user interface for a web application may be adjusted such that a particular feature of the web application can be accessed by a user in a first location of the user interface or in a second location of the user interface. The configuration parameters could be set such that a first version of the web application with the feature accessible in the first location of the user interface is rolled out to a first group of users/client computers 12 while a second version of the web application with the feature accessible in the second location of the user interface is rolled out to a second group of users/client computers 12. The utilization of the feature in the first group of users/client computer 12 can then be compared with the utilization of the feature in the second group of users/client computers 12 to determine the effectiveness of the placement of the feature in either the first location or the second location of the user interface.

In this way, the systems and methods of the present disclosure result in increased configurability between a client computer 12 and a server computer 16 to better and more effectively manage the allocation of resources associated with a particular cloud services session. In this way, a better user experience is provided across all cloud services sessions with a lower cost of goods and reduced engineering deployment cost associated with each cloud series session.

As another example of the beneficial utilization of the systems and methods of the present disclosure, the configuration parameters can be set to allow for controlled feature rollout or flighting of features. For example, the configuration parameters may be set such that a new user is provided a version of the web application with a smaller or basis feature set. AS the user gains experience, the configure parameters can then be adjusted during a cloud services session or for subsequent cloud services sessions to provide additional features to the web application as the user gains experience with the web application.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCam1, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A client device, comprising:
a processor;
memory in electronic communication with the processor; and
instructions stored in the memory being executable by the processor to:
initiate a stateful session for an application running on the client device by sending a session initiation request to a server, the stateful session comprising a stateful cloud service session in which server resources are allocated for the application running on the client device and in which the server stores information corresponding to a state of the application during the stateful session;
receive an initial server response from the server in response to the session initiation request, the initial server response including instructions for the application and at least one configuration parameter associated with allocation of server resources to be used during the stateful session;
determine, based on the instructions for the application received from the server, that the at least one configuration parameter is not acceptable;
in response to determining that the at least one configuration parameter is not acceptable, send an initial client response to the server including a proposed adjustment to the at least one configuration parameter,
receive, from the server in response the initial client response, a revision to the at least one configuration parameter indicating a revised allocation of server resources;
determine, based on the instructions for the application, whether the revision to the at least one configuration parameter is acceptable; and
send a subsequent client response to the server based on determining whether the revision to the at least one configuration parameter is acceptable.

2. The client device of claim 1, wherein the at least one configuration parameter indicates an initial allocation of server resources including one or more of a computational resource, a memory resource, or a storage resource on the server for the stateful session.

3. The client device of claim 2, wherein the revision to the at least one configuration parameter includes a revised allocation of the one or more of the computational resource, the memory resource, and the storage resource on the server for the stateful session.

4. The client device of claim 2, further comprising instructions being executable to send one or more additional adjustment requests to the server requesting one or more adjustments of the at least one configuration parameter during the stateful session, the one or more additional adjustment requests including one or more proposed modifications to the initial allocation of at least one of the computational resource, the memory resource, and the storage resource on the server for the stateful session.

5. The client device of claim 1, further comprising instructions being executable to send one or more additional adjustment requests to the server requesting one or more adjustments of the at least one configuration parameter during the stateful session.

6. The client device of claim 1, wherein the at least one configuration parameter includes an indication of whether Hypertext Transfer Protocol Secure (HTTPS) communication or WebSocket communication will be used during the stateful session.

7. The client device of claim 1, wherein the at least one configuration parameter indicates a quantity of server resources to be allocated for use by the application running on the client device.

8. A server device, comprising:
a processor;
memory in electronic communication with the processor; and
instructions stored in the memory being executable by the processor to:
receive a session initiation request from a client device to initiate a stateful session for a client application, the stateful session comprising a stateful cloud service session in which server resources are allocated for the client application running on the client device;
send an initial server response to the client in response to the session initiation request, the initial server response including instructions for the client application and at least one configuration parameter associated with allocation of server resources to be used during the stateful session;
determine that the client device has not approved the at least one configuration parameter;
in response to determining that the client device did not approve the at least one configuration parameter, send a subsequent server response including a revision to the at least one configuration parameter to the client device, the revision including a revised allocation to the initial allocation of server resources;
receive, from the client device based on a determination of whether the revised allocation to the initial allocation of server resources is acceptable, a subsequent client response indicating the determination of whether the proposed revision to the at least one configuration parameter is acceptable; and
store session state information in the memory of the server device, the session state information corresponding to a state of the client application running on the client device during the stateful session.

9. The server device of claim 8, wherein the at least one configuration parameter indicates an initial allocation of server resources including one or more of a computational resource, a memory resource, or a storage resource for the stateful session, and the revision to the at least one configuration parameter indicates the revised allocation of the server resources including one or more revised allocations of the computational resource, the memory resource, or the storage resource for the stateful session.

10. The server device of claim 8, wherein determining that the client device has not approved the at least one configuration parameter is based on a client response from the client device indicating that the client device has not approved the at least one configuration parameter from the initial server response.

11. The server device of claim 8, wherein determining that the client device has not approved the at least one configuration parameter is based on whether the server device receives a response to the initial server response from the client device within a predetermined time period.

12. The server device of claim 8, further comprising instructions being executable to send one or more additional adjustment requests to the client device indicating one or more adjustments of the at least one configuration parameter during the stateful session.

13. The server device of claim 8, wherein the at least one configuration parameter includes an indication of whether Hypertext Transfer Protocol Secure (HTTPS) communication or WebSocket communication will be used during the stateful session.

14. The server device of claim 8, wherein the at least one configuration parameter indicates a quantity of server resources to be allocated for use by the application running on the client device.

15. A method performed by a client device, comprising:
initiating a stateful session for an application running on the client device by sending a session initiation request to a server, the stateful session comprising a stateful cloud service session in which server resources are allocated for the application running on the client device and in which the server stores information corresponding to a state of the application during the stateful session;
receiving an initial server response from the server in response to the session initiation request, the initial server response including instructions for the application and at least one configuration parameter associated with allocation of server resources to be used during the stateful session, the at least one configuration parameter indicating a frequency of client-side rendering and pre-fetching content from the server;
determining based on the instructions for the application received from the server, that the at least one configuration parameter is not acceptable; and
sending an initial client response to the server, in response to a determination that the at least one configuration parameter is not acceptable, wherein the initial client response includes a proposed adjustment to the at least one configuration parameter.

16. The method of claim 15, wherein the at least one configuration parameter indicates an initial allocation of server resources including one or more of a computational resource, a memory resource, or a storage resource on the server for the stateful session.

17. The method of claim 16, further comprising:
receiving a subsequent server response in response to the initial client response, the subsequent server response including a revision to the at least one configuration parameter indicating a revised allocation of the server resources including one or more of the computational resource, the memory resource, or the storage resource on the server for the stateful session.

18. The method of claim 17, further comprising:
determining, based on instructions for the application received from the server, whether the revision to the at least one configuration parameter is acceptable; and
sending a subsequent client response to the server in response to determining whether the revision to the at least one configuration parameter is acceptable.

19. The method of claim 15, further comprising sending an adjustment request to the server requesting an adjustment of the at least one configuration parameter during the stateful session.

20. A method performed by a server device, comprising:
receiving a session initiation request from a client device to initiate a stateful session for a client application, the stateful session comprising a stateful cloud service session in which server resources are allocated for the application running on the client device;
sending an initial server response to the client in response to the session initiation request, the initial server response including instructions for the client application and at least one configuration parameter associated with allocation of server resources to be used during the stateful session, the at least one configuration parameter indicating a frequency of client-side rendering and pre-fetching content from the server device;

determining that the client device has not approved the at least one configuration parameter;

sending a subsequent server response to the client device in response to determining that the client device did not approve the at least one configuration parameter; and storing session state information in the memory of the server device, the session state information corresponding to a state of the client application running on the client device during the stateful session.

21. The method of claim 20 wherein the at least one configuration parameter indicates an initial allocation of server resources including one or more of a computational resource, a memory resource, or a storage resource for the stateful session and the subsequent server response includes a revision to the at least one configuration parameter indicating a revised allocation of the server resources including one or more of the computational resource, the memory resource, or the storage resource for the stateful session.

22. The method of claim 21, further comprising sending an adjustment request to the client device indicating an adjustment of the at least one configuration parameter during the stateful session, wherein the adjustment request includes a proposed modification to the initial allocation of server resources including one or more of the computational resource, the memory resource, or the storage resource for the stateful session, wherein the adjustment request is sent subsequent to determining that the client device has not approved the at least one configuration parameter.

23. The method of claim 20, further comprising sending an adjustment request to the client device indicating an adjustment of the at least one configuration parameter during the stateful session.

* * * * *